(12) United States Patent
Shen et al.

(10) Patent No.: US 8,580,164 B2
(45) Date of Patent: Nov. 12, 2013

(54) METHOD OF MANUFACTURING MOLD AND METHOD OF FORMING OPTICAL FILM BY MOLD

(75) Inventors: Chun-Yu Shen, Changhua County (TW); Sheng-Fa Liu, Hsinchu County (TW); Yu-Hsien Chen, Kaohsiung (TW); Huai-An Li, Taoyuan County (TW); Bao-Sian Ciou, New Taipei (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 277 days.

(21) Appl. No.: 13/102,018

(22) Filed: May 5, 2011

(65) Prior Publication Data
US 2012/0211908 A1    Aug. 23, 2012

(30) Foreign Application Priority Data
Feb. 23, 2011    (TW) .............................. 100105961 A

(51) Int. Cl.
*B29D 11/00*    (2006.01)
*B29C 33/00*    (2006.01)

(52) U.S. Cl.
USPC ............ 264/2.5; 264/219; 425/808; 427/133; 427/162

(58) Field of Classification Search
USPC ........... 264/1.1, 1.34, 2.5, 219, 225; 425/808; 427/133, 162
See application file for complete search history.

(56) References Cited

U.S. PATENT DOCUMENTS

| 5,759,456 | A | * | 6/1998 | Watanabe et al. ............... 264/2.5 |
| 2006/0077555 | A1 | | 4/2006 | Chen |
| 2009/0091705 | A1 | * | 4/2009 | Matsui .......................... 351/172 |
| 2010/0276844 | A1 | * | 11/2010 | Han et al. ..................... 264/400 |

FOREIGN PATENT DOCUMENTS

| CN | 1973217 A | | 5/2007 |
| CN | 101611332 A | | 12/2009 |
| TW | I325818 | | 6/2010 |
| WO | WO 2009/116448 | * | 9/2009 |

* cited by examiner

*Primary Examiner* — Mathieu D. Vargot
(74) *Attorney, Agent, or Firm* — Winston Hsu; Scott Margo

(57) ABSTRACT

A method of manufacturing a mold includes following steps. Providing a solution, which includes a solvent, a solute and a plurality of nanoparticles. Providing a first substrate. Spin coating the solution on the first substrate, and then vaporizing the solvent to form a first mold on the first substrate. Thus, an upper surface of the first mold has a plurality of first porous structures. The present invention further includes forming an optical film having protrusion patterns with the aforementioned mold.

14 Claims, 9 Drawing Sheets

METHOD OF MANUFACTURING MOLD AND METHOD OF FORMING OPTICAL FILM BY MOLD

BACKGROUND OF THE INVENTION

1. Field of the Invention

The present invention relates to a method of manufacturing a mold and a method of forming optical film by a mold, and more particularly, to a method of forming a mold by a spin coating process.

2. Description of the Prior Art

Since varieties of display technologies have been well developed and widely used in recent years, fabrication techniques for optical films, such as diffusion film, brightness enhancement film, etc., applied to display devices are highly developed. In general, the light scattering effect or light focusing effect of the aforementioned optical films are achieved by microstructures formed on surfaces of the optical films.

In conventional method, the microstructures are formed on a mold by a photolithography and etching process in advance, and a roller imprinting process is then performed to imprint the pattern of the microstructures on the surface of the optical film. However, the method of manufacturing the mold by performing photolithography and etching process is not preferable due to its high fabrication cost and high complexity, and thus needs to be improved.

SUMMARY OF THE INVENTION

It is therefore one of the objectives to provide a method of manufacturing a mold for an optical film with microstructures by a spin coating process so as to simplify fabrication processes and to reduce fabrication cost.

In accordance with a preferred embodiment of the present invention, a method of manufacturing a mold includes following steps. A solution comprising a solvent, a solute and a plurality of nanoparticles is provided. A first substrate is provided, and the solution is spin coated on the first substrate. Next, the solvent is vaporized and therefore a first mold is formed on the first substrate. An upper surface of the first mold has a plurality of first porous structures.

In accordance with another preferred embodiment of the present invention, a method of manufacturing an optical film by the molds includes following steps. A first mold is formed, and a solution comprising a solvent, a solute and a plurality of nanoparticles is provided. A first substrate is provided, and the solution is spin coated on the first substrate, and then the solvent is vaporized and therefore a first mold is formed on the first substrate. The first mold has a plurality of first porous structures formed on an upper surface thereof. After that, an imprinting process is performed, and the imprinting process includes coating a material layer on the upper surface of the first mold; a curing process is performed on the material layer; and the material layer is separated form the upper surface of the first mold. The material layer includes a plurality of first protrusion patterns complementary to the first porous structures.

In accordance with another preferred embodiment of the present invention, a method of manufacturing the optical film by the molds includes following steps. A first mold is formed, and a solution comprising a solvent, a solute and a plurality of nanoparticles is provided. A first substrate is provided, and the solution is spin coated on the first substrate, and then the solvent is vaporized and therefore a first mold is formed on the first substrate. The first mold has a plurality of first porous structures formed on an upper surface thereof. Also, a second substrate is provided, and the solution is spin coated on the second substrate, and then the solvent is vaporized and therefore a second mold is formed on the second substrate. The second mold has a plurality of second porous structures formed on an upper surface thereof. The first substrate and the second substrate are correspondingly bonded to form a space between the first substrate and the second substrate. Then, a filling process is performed to fill the space with a material layer. A curing process is performed on the material layer so as to separate the material layer from the upper surface of the first mold and the upper surface of the second mold. A surface of the material layer has a plurality of first protrusion patterns complementary to the first porous structures, and another surface of the material layer a plurality of second protrusion patterns complementary to the second porous structures.

In the method of manufacturing the mold of the present invention, a spin coating process is performed to fabricate the mold, and the upper surface of the mold formed by performing the spin coating process has a plurality of porous structures. In the method of manufacturing the optical film by molds of the present invention, an imprinting process is performed to imprint the porous structures formed on the molds on the surfaces of the optical film so as to form the protrusion patterns complementary to the porous structures. Accordingly, fabrication costs and process complexity can be reduced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention for one skilled in the art, preferred embodiments will be detailed as follows. The preferred embodiments of the present invention are illustrated in the accompanying drawings with numbered elements to elaborate the contents and effects to be achieved.

Figure 1:
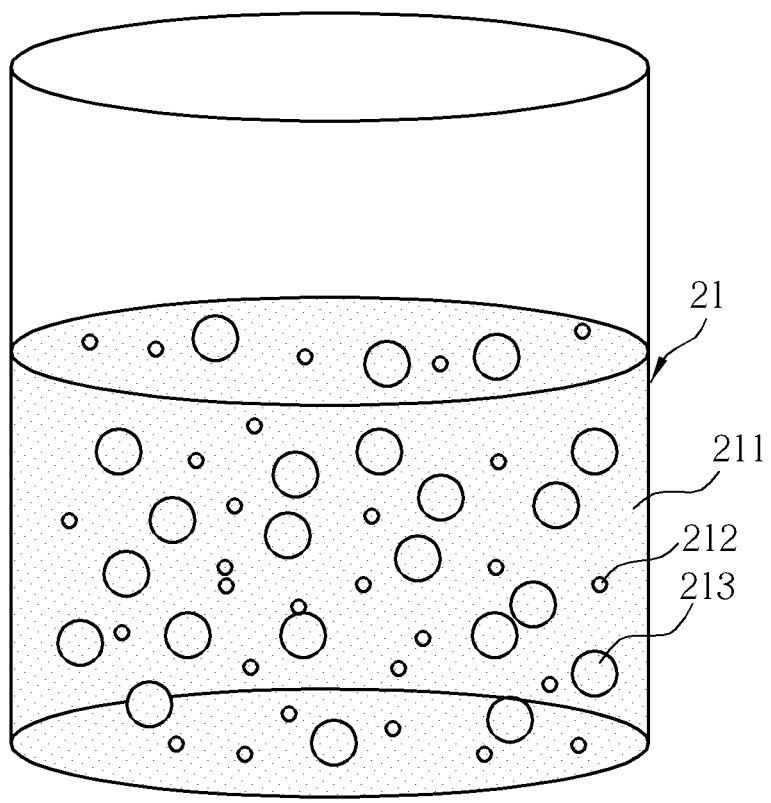
FIG. 1 and FIG. 2 are schematic diagrams illustrating a method of manufacturing a mold according to a preferred embodiment of the present invention.
Figure 2:
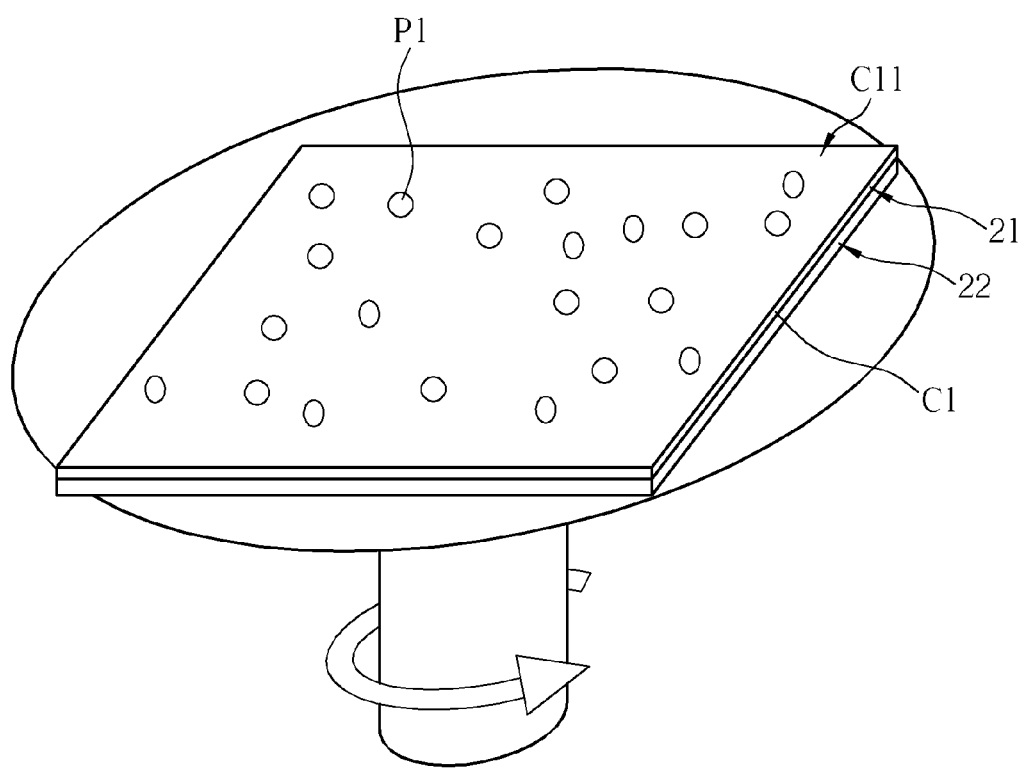

Please refer to FIG. 1 and FIG. 2, which schematically illustrate a method of manufacturing a mold according to a preferred embodiment of the present invention. As shown in FIG. 1, a solution 21 is provided, and the solution 21 includes a solvent 211, a solute 212, and a plurality of nanoparticles 213. In this embodiment, the solvent 211 can be tetrahydrofuran (THF), for example, but not limited thereto. The solute 212 can be polystyrene (PS), for example, but not limited thereto. The nanoparticles 213 are particles made of organic materials or inorganic materials on the nanometer scale. Also the nanoparticles 213 in this embodiment are carbon nanotubes (CNTs), but not limited thereto. For instance, the nanoparticles 213 also can be salts, such as barium titanate. According to this embodiment, the solute 212 is added into the solvent 211, and then a step of heating and stirring is executed to completely dissolve the solute 212 in the solvent 211. Then, the nanoparticles 213 are added and stirred. Thus, the well-mixed solution 21 is accomplished. In this embodiment, a weight percent of the solute 212 preferably lies between 6% and 10% of the total solution 21, and a weight percent of the nanoparticles 213 is preferably 0.25% of the total solution 21, but not limited thereto. The weight percents of the solute 212 and the nanoparticles 213 can be altered according to different kinds of the solute 212 and the nanoparticles 213. Next, as shown in FIG. 2, a first substrate 22 is provided, and a spin coating process is performed to coat the solution 21 on the first substrate 22. After the solvent is vaporized, the first mold C1 is formed on the first substrate 22. It is noted that the nanoparticles 213 tend to aggregate in the solution 21, and a small mount of the solvent 211 surrounded by aggregated nanoparticles 213 is rapidly vaporized in the spin coating process due to centrifugal forces. As a result, a plurality of first porous structures P1 are formed on an upper surface C11 of the first mold C1.

Figure 3:
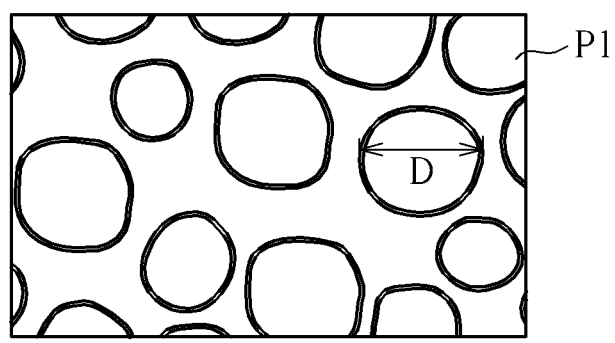
FIG. 3 is an enlarged diagram illustrating the mold manufactured by the manufacturing method according to the preferred embodiment of the present invention.

Please refer to FIG. 3, which schematically illustrates an enlarged view of the mold manufactured by the manufacturing method according to the preferred embodiment of the present invention. As shown in FIG. 3, in this embodiment, each of the first porous structures P1 has a particle diameter D preferably lying between 1 µm and 5 µm. In addition, a depth of each of the first porous structures P1 preferably lies between 2 µm and 4 µm, but not limited thereto.

Figure 4:
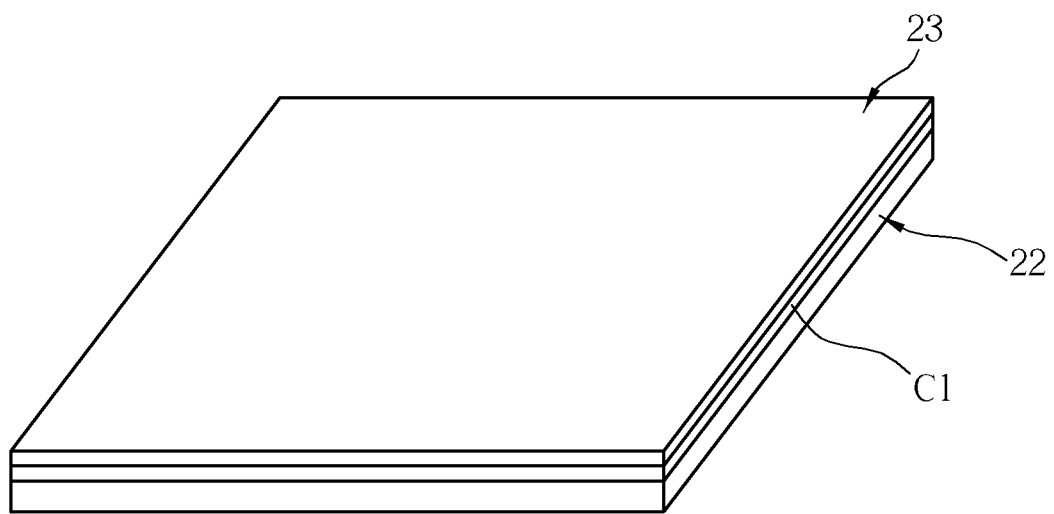
FIG. 4 and FIG. 5 are schematic diagrams illustrating a method of manufacturing an optical film by the mold according to another preferred embodiment of the present invention.
Figure 5:
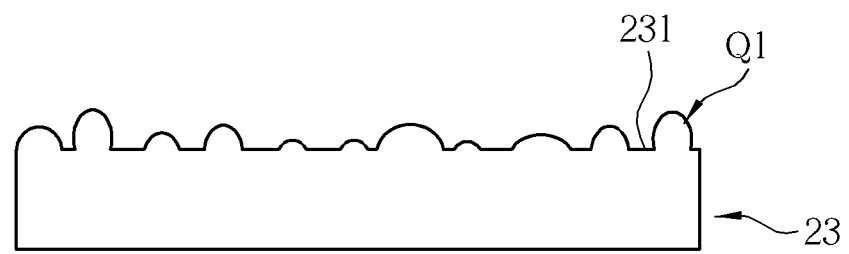

Moreover, in accordance with another preferred embodiment of the present invention, an imprinting process is additionally performed with the aforementioned mold to imprint the first porous structures P1 of the first mold C1 on a material layer so as to form a film with optical properties. Please refer to FIG. 4 and FIG. 5, and also refer to FIG. 1 through FIG. 3. FIG. 4 and FIG. 5 schematically illustrate a method of manufacturing an optical film by the mold according to another preferred embodiment of the present invention. As shown in FIG. 4, an imprinting process including the following steps is performed. A material layer 23 is provided, and coated on the upper surface of the first mold C1 by performing, for example, a spin coating process or a slit coating process. In this embodiment, the material layer 23 is made of, for example, polydimethylsiloxane (PDMS), but not limited thereto. For example, the material layer 23 can be other kinds of transparent thermocuring materials or photocuring materials based on design requirements. In addition, a coating thickness of the material layer 23 also can be altered according to requirements. The material layer 23 is then hardened, for example, by heating or keeping it in a static state for a period of time. Next, as shown in FIG. 5, the material layer 23 is separated from the upper surface C11 of the first mold C1, so that the surface 231 of the material layer 23 has a plurality of first protrusion patterns Q1 complementary to the first porous structures P1. Thus, the optical film with the first protrusion patterns Q1 formed on a single surface is accomplished. Accordingly, in this embodiment, the first protrusion patterns Q1 formed on the material layer 23 correspond to the first porous structures P1 formed on the first mold C1. Therefore, a diameter of each of the first protrusion patterns Q1 preferably lies between 1 µm and 5 µm, and a height of each of the first protrusion patterns Q1 preferably lies between 2 µm and 4 µm, but not limited thereto.

Figure 6:
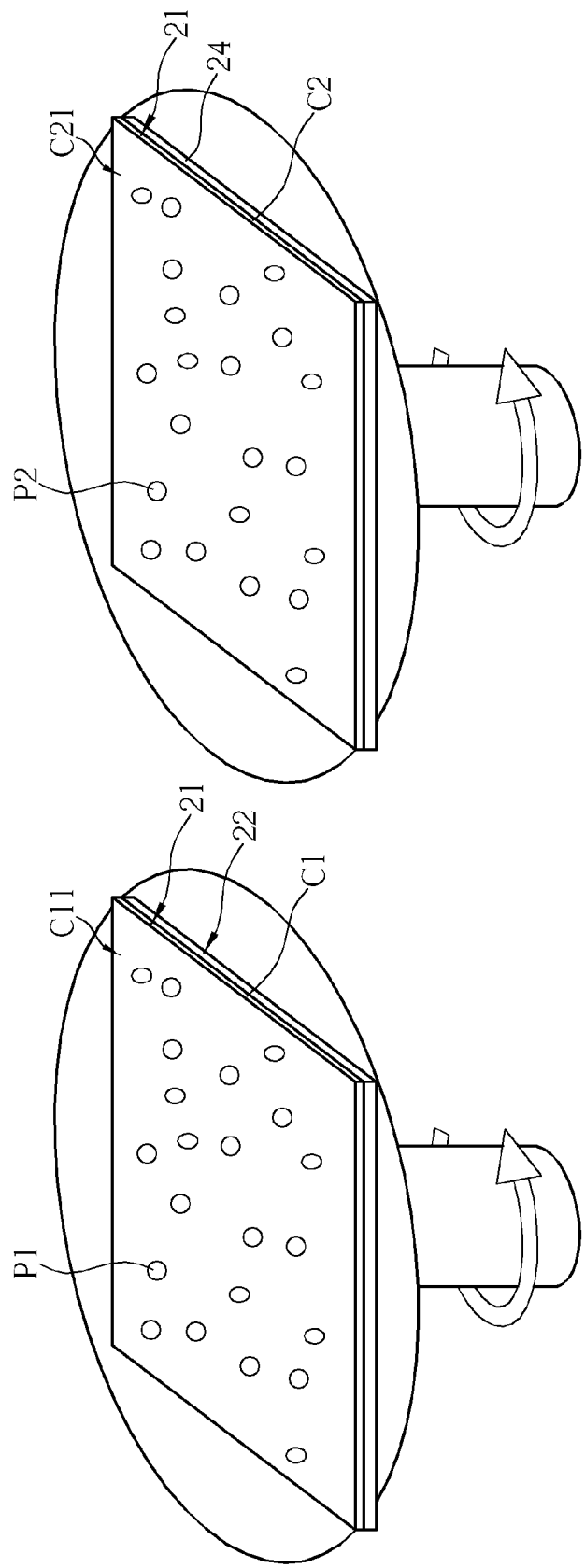
FIG. 6 through FIG. 9 are schematic diagrams illustrating a method of manufacturing an optical film by the molds according to still another preferred embodiment of the present invention.
Figure 7:
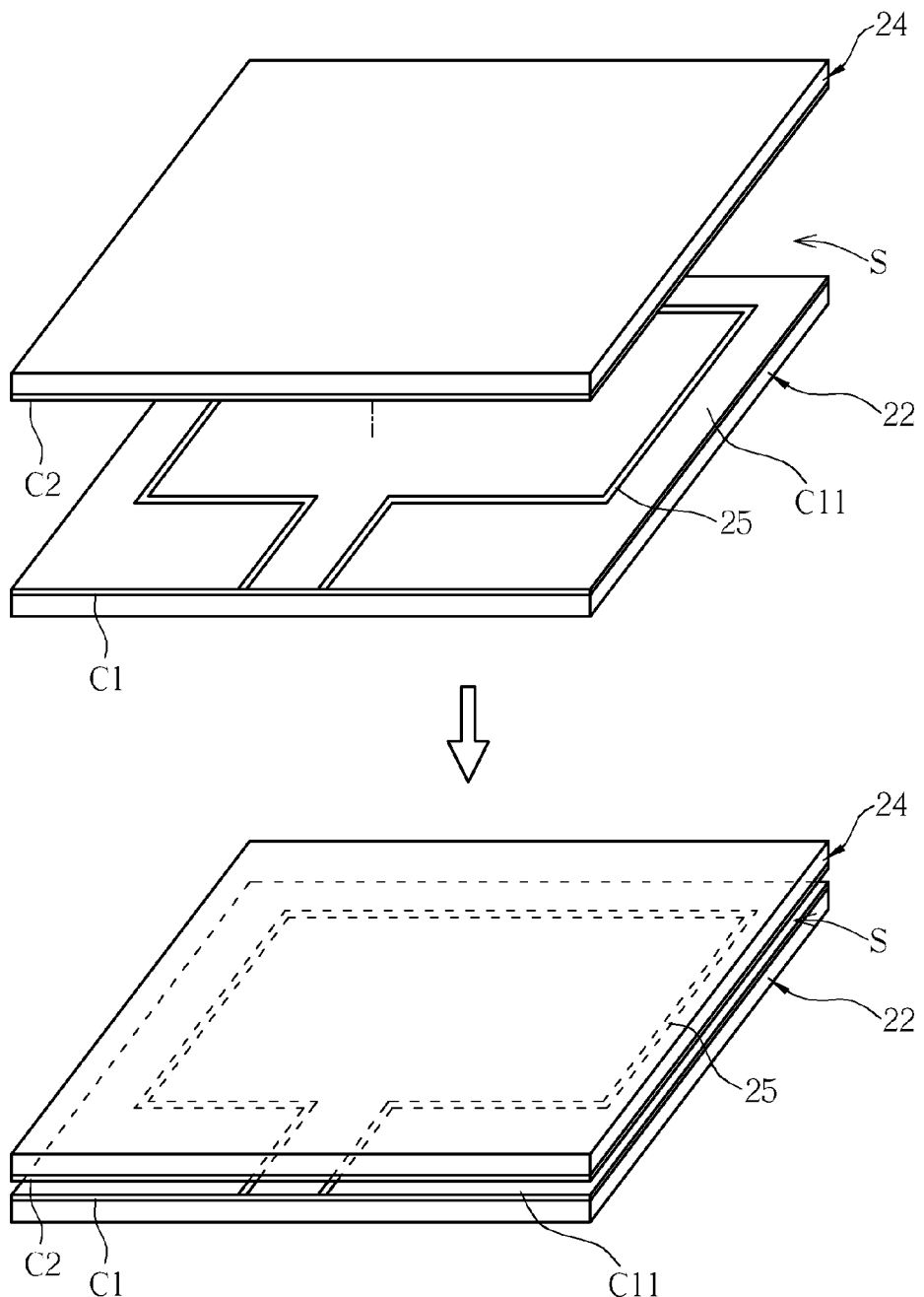

In addition to performing the imprinting process to manufacture the aforementioned optical film with the protrusion patterns formed on a single surface, an optical film with the protrusion patterns formed on both surfaces also can be manufactured according to a variant embodiment. For the sake of clear comparison between variant embodiments, identical components are denoted by identical numerals, and the following description focuses on the differences between embodiments. Please refer to FIG. 6 through FIG. 9, and also refer to FIG. 1 through FIG. 3. FIG. 6 through FIG. 9 schematically illustrate a method of manufacturing an optical film by the molds according to still another preferred embodiment of the present invention. As shown in FIG. 6, a first substrate 22 and a second substrate 24 are provided. The solution 21 is spin coated on both the first substrate 22 and the second substrate 24, and then the solvent 211 is vaporized and therefore a first mold C1 and a second mold C2 are respectively formed on the first substrate 22 and the second substrate 24. Thus, an upper surface C11 of the first mold C1 has a plurality of first porous structures P1, and an upper surface C21 of the first mold C2 has a plurality of second porous structures P2. As shown in FIG. 7, the first substrate 22 and the second substrate 24 are correspondingly bonded subsequently, and a space S is formed between the first mold C1 formed on the first substrate 22 and the second mold C2 formed on the second substrate 24. It is appreciated that the first substrate 22 and the second substrate 24 in this embodiment are bonded by a sealant 25, but not limited thereto. The first substrate 22 and the second substrate 24 also can be bonded by utilizing other methods based on different designs and requirements for material and process.

Figure 8:
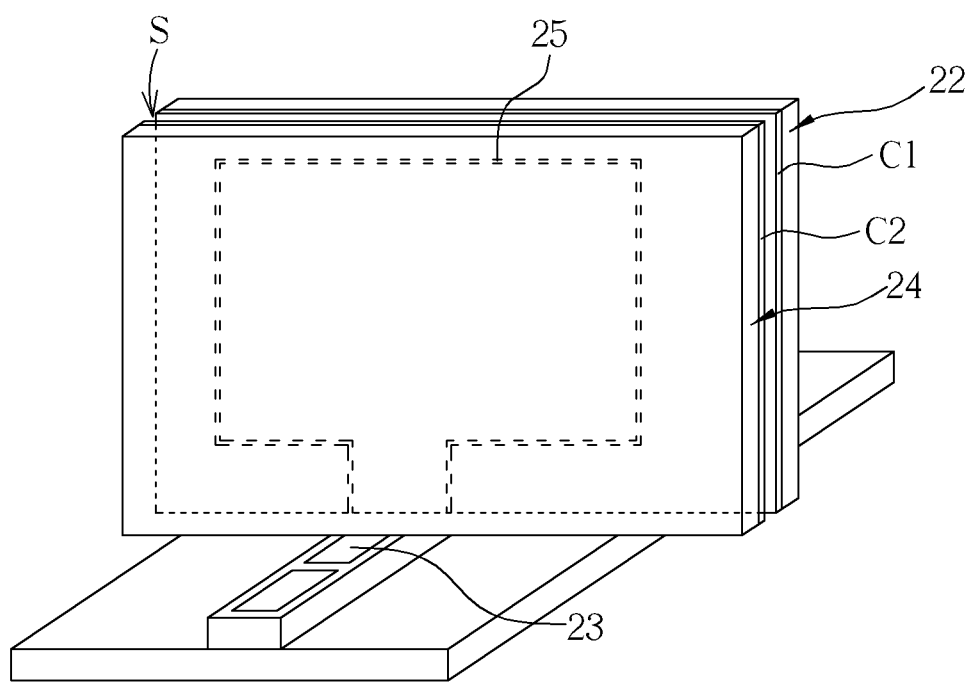
Figure 9:
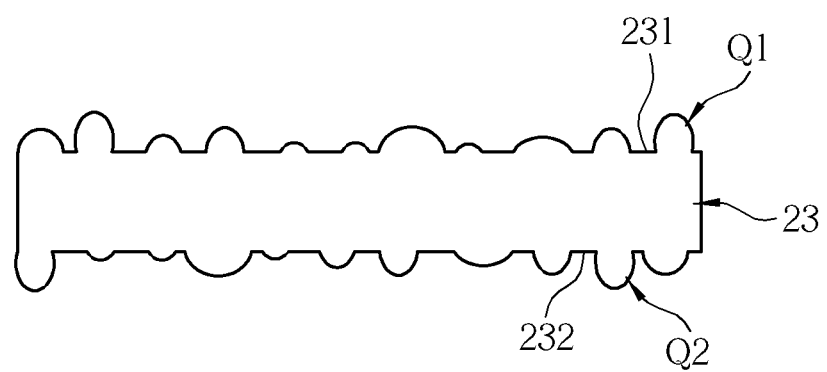

As shown in FIG. 8, a filling process is performed subsequently to fill the material layer 23 into the space S formed between the first substrate 22 and the second substrate 24. In this embodiment, the filling process is a vacuum filling process performed in a vacuum chamber for filling the material layer 23 into the space S by capillary effect, but not limited thereto. Moreover, in this embodiment, a volume of the material layer 23 is defined by the space S constituted by the first mold C1, the second mold C2, and the sealant 25. In other words, on condition that areas of the upper surface of the first mold C1 and the upper surface of the second mold C2 are unchanged, the volume of the material layer 23 can be adjusted by altering the coating thickness of the sealant 25, so that the thickness of the accomplished optical film can be adjusted. After that, a curing process is performed to harden the material layer 23. Finally, as shown in FIG. 9, the material layer 23 is separated from the upper surface C11 of the first mold C1 and the upper surface C21 of the second mold C2. Thus, the surface 231 of the material layer 23 has the plurality of first protrusion patterns Q1 complementary to the first porous structures P1, and another surface 232 of the material layer 23 has the plurality of second protrusion patterns Q2 complementary to the second porous structures P2. Therefore, the optical film with the protrusion patterns formed on both surfaces is accomplished.

To sum up, the method of manufacturing the molds of the present invention utilizes the spin coating process to fabricate the molds, and the upper surfaces of the molds formed by performing the spin coating process has a plurality of porous structures. In addition, the method of manufacturing the optical film by the molds is also provided in the present invention. The method utilizes the imprinting process to imprint the porous structures on the surfaces of the optical film so as to form the protrusion patterns complementary to the porous structures. Accordingly, fabrication costs and process complexity can be reduced.

Those skilled in the art will readily observe that numerous modifications and alterations of the device and method may be made while retaining the teachings of the invention.

What is claimed is:

1. A method of manufacturing a mold, comprising:
   providing a solution, comprising a solvent, a solute and a plurality of nanoparticles;
   providing a first substrate; and
   spin coating the solution on the first substrate, and vaporizing the solvent to form a first mold on the first substrate, wherein an upper surface of the first mold has a plurality of first porous structures, the nanoparticles are aggregated in the solution, and the solvent surrounded by the aggregated nanoparticles is vaporized during spin coating due to centrifugal forces so as to form the first porous structures.

2. The method of manufacturing the mold according to claim 1, wherein the nanoparticles include organic materials or inorganic materials.

3. The method of manufacturing the mold according to claim 2, wherein the organic materials include carbon nanotubes.

4. The method of manufacturing the mold according to claim 2, wherein the inorganic materials include barium titanate.

5. The method of manufacturing the mold according to claim 1, wherein the solute includes polystyrene.

6. The method of manufacturing the mold according to claim 1, wherein the solvent includes tetrahydrofuran.

7. The method of manufacturing the mold according to claim 1, further comprising:
   providing a second substrate;
   spin coating the solution on the second substrate, and vaporizing the solvent to form a second mold on the second substrate, wherein an upper surface of the second mold has a plurality of second porous structures, the nanoparticles are aggregated in the solution, and the solvent surrounded by the aggregated nanoparticles is vaporized during spin coating due to centrifugal forces so as to form the second porous structures; and
   bonding the first substrate and the second substrate correspondingly to form a space between the first mold formed on the first substrate and the second mold formed on the second substrate.

8. A method of manufacturing an optical film by mold, comprising:
   forming a first mold, comprising:
      providing a solution, comprising a solvent, a solute and a plurality of nanoparticles;
      providing a first substrate; and
      spin coating the solution on the first substrate, and vaporizing the solvent to form a first mold on the first substrate, wherein an upper surface of the first mold has a plurality of first porous structures, the nanoparticles are aggregated in the solution, and the solvent surrounded by the aggregated nanoparticles is vaporized during spin coating due to centrifugal forces so as to form the first porous structures; and
   performing an imprinting process, comprising:
      coating a material layer on the upper surface of the first mold;
      performing a curing process on the material layer; and
      separating the material layer form the upper surface of the first mold, wherein the material layer has a plurality of first protrusion patterns complementary to the first porous structures.

9. The method of manufacturing the optical film by the mold according to claim 8, wherein the material layer includes a thermocuring material.

10. The method of manufacturing the optical film by the mold according to claim 9, wherein the thermocuring material includes polydimethylsiloxane.

11. A method of manufacturing optical film by molds, comprising:
   forming a first mold, comprising:
      providing a solution, comprising a solvent, a solute and a plurality of nanoparticles;
      providing a first substrate; and
      spin coating the solution on the first substrate, and vaporizing the solvent to form a first mold on the first substrate, wherein an upper surface of the first mold has a plurality of first porous structures, the nanoparticles are aggregated in the solution, and the solvent surrounded by the aggregated nanoparticles is vaporized during spin coating due to centrifugal forces so as to form the first porous structures; and
   forming a second mold, comprising:
      providing a second substrate;
      spin coating the solution on the second substrate, and vaporizing the solvent to form a second mold on the second substrate, wherein an upper surface of the second mold has a plurality of second porous structures, the nanoparticles are aggregated in the solution, and the solvent surrounded by the aggregated nanoparticles is vaporized during spin coating due to centrifugal forces so as to form the second porous structures; and
      bonding the first substrate and the second substrate correspondingly to form a space between the first mold formed on the first substrate and the second mold formed on the second substrate;
   performing a filling process for filling a material layer into the space;
   performing a curing process on the material layer; and
   separating the material layer form the upper surface of the first mold and the upper surface of the second mold, wherein a surface of the material layer has a plurality of first protrusion patterns complementary to the first porous structures, and the other surface of the material layer has a plurality of second protrusion patterns complementary to the second porous structures.

12. The method of manufacturing the optical film by the molds according to claim 11, wherein the filling process includes a vacuum filling process.

13. The method of manufacturing the optical film by the molds according to claim 11, wherein the material layer includes a thermocuring material.

14. The method of manufacturing the optical film by the molds according to claim 13, wherein the thermocuring material includes polydimethylsiloxane.

\* \* \* \* \*